US005548533A

United States Patent [19]

Gao et al.

[11] Patent Number: 5,548,533
[45] Date of Patent: Aug. 20, 1996

[54] OVERLOAD CONTROL FOR A CENTRAL PROCESSOR IN THE SWITCHING NETWORK OF A MOBILE COMMUNICATIONS SYSTEM

[75] Inventors: Zhengping Gao, Gaithersburg, Md.; Steve Racz, Dallas; Kalyan Basu, Plano, both of Tex.

[73] Assignee: Northern Telecom Limited, Montreal, Canada

[21] Appl. No.: 319,678

[22] Filed: Oct. 7, 1994

[51] Int. Cl.$^6$ ................................................. H04B 1/60
[52] U.S. Cl. ........................ 364/514 C; 364/551.01; 455/33.1; 455/9
[58] Field of Search ........................... 364/514 A, 514 B, 364/514 C, 514 R, 551.01; 455/33.1, 9; 379/133

[56] References Cited

U.S. PATENT DOCUMENTS

| | | | |
|---|---|---|---|
| 5,134,709 | 7/1992 | Bi et al. | 455/33.1 |
| 5,276,911 | 1/1994 | Levine et al. | 455/53.1 |
| 5,304,990 | 4/1994 | Rebourg et al. | 340/825.06 |
| 5,404,573 | 4/1995 | Yabe et al. | 455/33.1 |
| 5,418,843 | 5/1995 | Stjernholm | 379/112 |
| 5,423,062 | 6/1995 | Sakakura | 455/54.1 |
| 5,430,729 | 7/1995 | Rahnemg | 270/94.1 |
| 5,432,776 | 7/1995 | Harper | 370/17 |
| 5,442,680 | 8/1995 | Schellinger et al. | 379/58 |
| 5,442,682 | 8/1995 | Svedin et al. | 379/59 |
| 5,448,624 | 9/1995 | Hardy et al. | 379/67 |
| 5,448,761 | 9/1995 | Ushirokawa | 455/62 |
| 5,454,026 | 9/1995 | Tanaka | 379/60 |

*Primary Examiner*—James P. Trammell
*Assistant Examiner*—Patrick J. Assouad
*Attorney, Agent, or Firm*—Lee, Mann, Smith, McWilliams, Sweeney & Ohlson

[57] ABSTRACT

An overload control for a central processor in the switching network of a mobile radio system. The central processor may be part of a Mobile services Switching Center (MSC). Congestion reports, based on the delay experienced by messages awaiting processing at the central processor, are broadcast to peripheral processors. The peripheral processors may be located in the MSC at interfaces of the MSC to other network elements such as base stations, the PSTN, other MSCs. Peripheral processors maintain variable message origination thresholds responsive to the congestion reports.

15 Claims, 6 Drawing Sheets

OVERLOAD CONTROL FOR A CENTRAL PROCESSOR IN THE SWITCHING NETWORK OF A MOBILE COMMUNICATIONS SYSTEM

This invention relates to mobile communications systems and in particular to the flow of messages between processors in the switching network of a mobile communications system.

BACKGROUND OF THE INVENTION

In a mobile communications system such as the GSM cellular system call processing, control and management require many messages to be passed within the system. Mobility introduces a relatively random element in the amount of work that an office such as the Mobile services Switching Centre (MSC) within the system must perform because of the unpredictable nature of the location of mobile stations.

Normally engineering guidelines can be used to limit overload conditions (for example by limited provisioning of trunks and signalling support such as Signalling system No.7 links). Even with such limits, the amount of work that can be offered to an office can be beyond the capacity of the equipment because offices are provisioned for sustained levels of service and typically not to accommodate unusual or periodic spikes.

In an office serving mobile stations, office engineering can have severe limitation because of the transient nature of the subscribers and because of the disassociation between the subscriber equipment and the office equipment. As a result some form of control must be put in place to maintain the maximum amount of processing (i.e.: processing that results in service provision to the mobile customer or processing which provides revenue generation to the service provider) with the minimum amount of disruption.

The GSM specifications require that switching elements should exchange messages indicating overload and also recommend some ways in which traffic towards an overloaded switch may be reduced, such as by call gapping.

It is an object of the present invention to provide an overload control mechanism to allow a mobile switch to function at its optimum condition when the traffic load is beyond its capacity.

SUMMARY OF THE INVENTION

According to the present invention there is provided a method of controlling overload of a central processor in the switching network of a mobile communications system, in which network peripheral processors send messages to a central processor, which method comprises the steps of:

monitoring delay experienced by messages awaiting processing at the central processor;

using the monitored delay to compile central processor congestion reports;

broadcasting the central processor congestion reports from the central processor to the peripheral processors; and maintaining, at the peripheral processors, variable message origination thresholds responsive to said central processor congestion reports.

According to another aspect of the present invention there is provided a mobile communications system comprising a switching network having a central processor and a plurality of peripheral processors, the central processor receiving messages from the peripheral processors, wherein the central processor includes:

monitoring means to monitor delay experienced by messages awaiting processing at the central processor;

computing means to compile central processor congestion reports based on monitored delay supplied by the monitoring means;

broadcasting means to broadcast the central processor congestion reports from the central processor to the peripheral processors;

and wherein each peripheral processor includes:

threshold setting means, responsive to congestion reports received from the central processor, to maintain variable message origination thresholds;

whereby to control overload of the central processor.

BRIEF DESCRIPTION OF THE DRAWINGS

Embodiments of the invention will now be described with reference to the accompanying drawings in which.

DESCRIPTION OF PREFERRED EMBODIMENTS

Although the invention is described in this preferred embodiment with reference to GSM (Global System for Mobile communications), it is evidently applicable to other mobile radio systems such as TACS, AMPS, IS-54. It is also to be understood that although the central processor of the invention is described with reference to a central processor of a Mobile Services switching Centre, it could apply to a central processor in other parts of the switching network of a mobile communications system.

Figure 1:
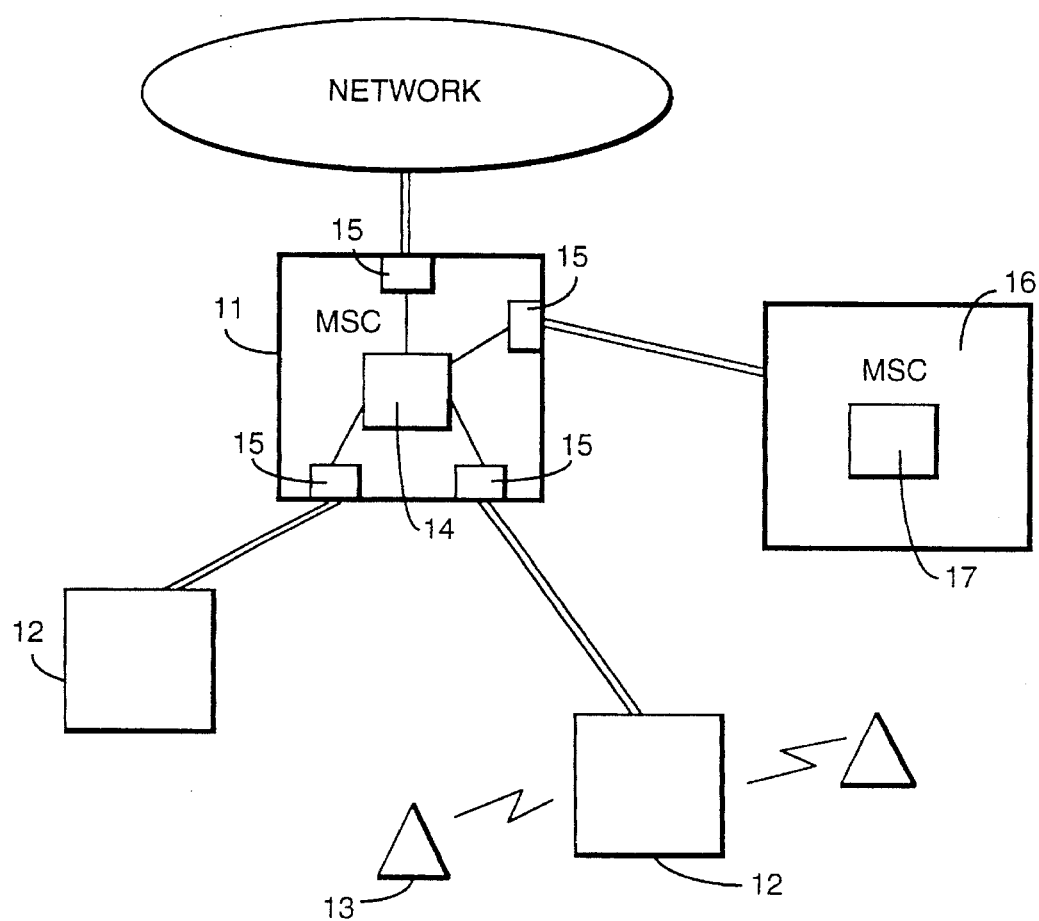
FIG. 1 illustrates in schematic form part of a mobile communications system according to one aspect of the invention.

Referring first to FIG. 1, the mobile communications system includes a plurality of base stations 12, each of which serves mobile handsets 13 currently disposed within its service area. Each base station is coupled to a mobile switching centre (MSC) 11, which switching centre provides an interface to the public network. Operation of the MSC 11 is controlled by a central processor 14 which receives messages from base stations 12 in addition to processors 17 of other MSCs 16 and processors in the network.

According to one embodiment of the invention, message arrivals to the central processor from each network element (base stations 12, other MSCs 16) are controlled by one or more peripheral processors 15. Advantageously these peripheral processors are located locally at the MSC 11. New call initiations first appear on these peripheral processors 15. The central processor 14 has two queues to buffer the messages to be processed; an origination queue and a progress queue. The origination queue is the queue to which the first message of a new call (location update, registration and handover) is sent by the peripheral processor. The following messages in the call will be placed either on the progress queue or the origination queue depending on whether the message introduces a new call procedure. Messages in the progress queue have higher priority than the messages placed on origination queues. Based on priority queue analysis it has been shown that the origination queue delay is a valid indication of call processing occupancy of the processor in which call processing takes place. The origination queue delay is monitored and a congestion state is subsequently determined in the main call processing processor, the Central Processor (CP). This status is then broadcast to the peripheral processors that are the source of new call initiations. These processors receive the status and in turn regulate the initiation of new calls by maintaining dynamic thresholds. This feedback mechanism is known as the System Overload Control (SOC) and has, through modelling been fine tuned and proven to be an effective overload control mechanism for use in a GSM-MSC.

Algorithm Description

Determining overload of the central processor

Figure 2:
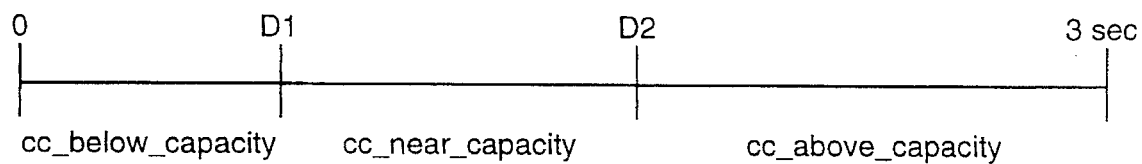
FIG. 2 illustrates capacity thresholds as used in the system of FIG. 1.
Figure 3A:
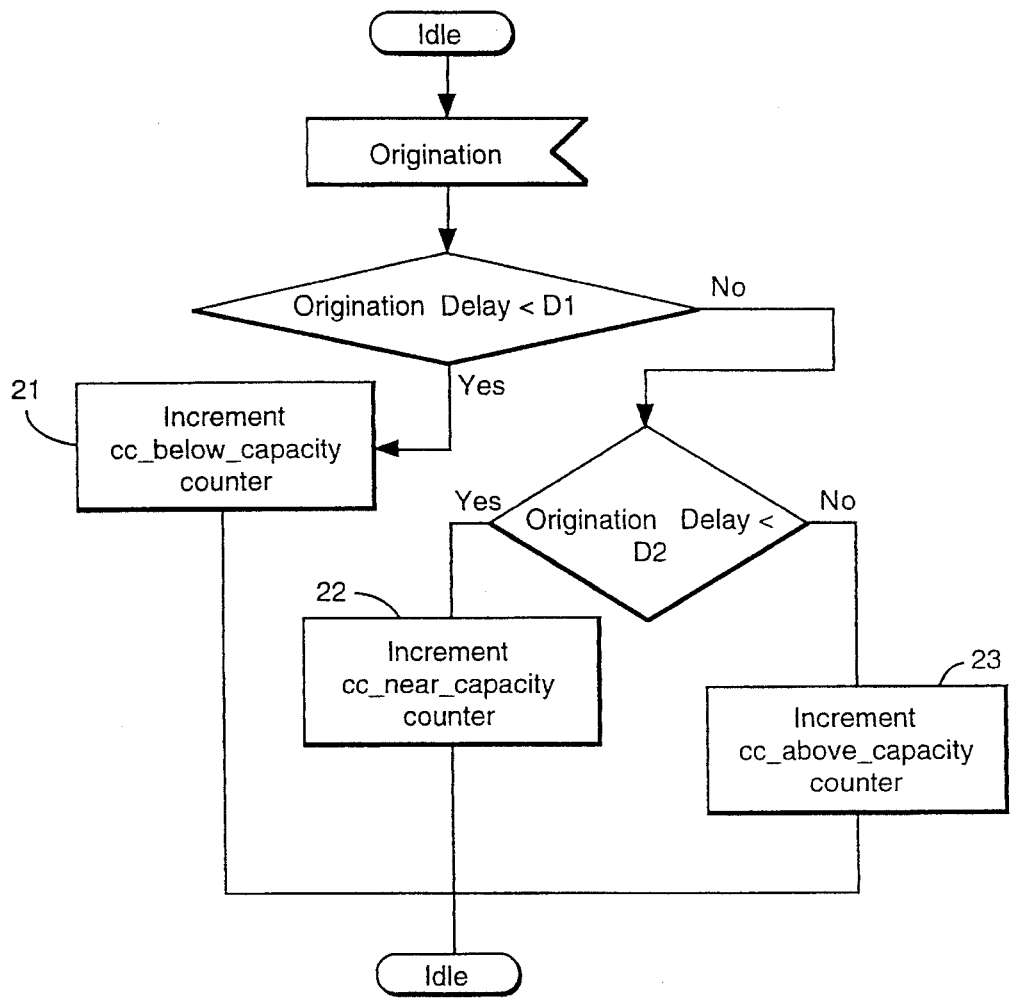
FIGS. 3A and 3B illustrate an overload detection algorithm and broadcasting routine used in the central processor of the system of FIG. 1.

Detection of overload takes place in the central processor 14. Messages for new calls are placed on an origination queue and a time stamp of their arrival time is placed in the message. When the message is processed and is removed from the origination queue, the current time stamp is compared to the time stamp stored in the message and the queue delay is calculated. Queue delays are partitioned into three distinct time periods. These time periods are engineerable and are set by selecting points along the queuing delay versus throughput curve to represent the thresholds (FIG. 2) between 'cc below capacity' and 'cc near capacity' (D1) and between 'cc near capacity' and 'cc above capacity' (D2) or overload. With reference to FIG. 3A, a counter 21, 22, 23 is maintained for each of these three time periods and the appropriate counter is incremented based on the queue delay calculated for each message as it is processed by the central processor.

Figure 3B:
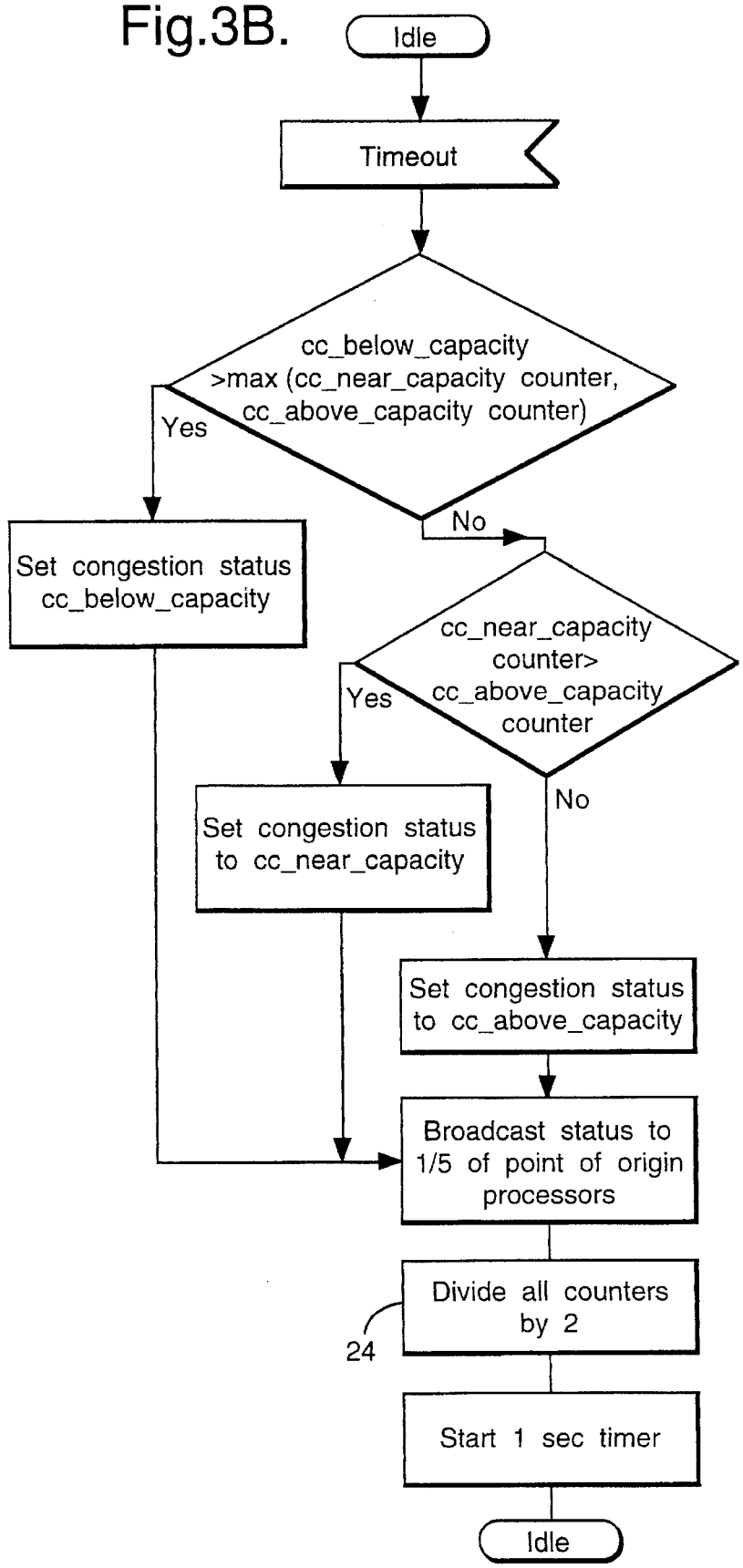

Now referring to FIG. 3B, once a second, these counters are examined and the congestion status of the processor is determined by the counter which has the greatest value in that time interval. Each of these counters is divided by 2 24 at this time to provide hysteresis of the transition from one congestion state to the next.

Overload broadcast

Call origination messages are first generated mainly by peripheral processors. In order for the overload condition calculated in the central processor to feedback to the peripheral processors, the central processor broadcasts the current congestion status to the peripheral processors participating in the overload control mechanism every second. In the case in which the congestion status of the central processor indicates 'congested', the broadcast of status messages is halted.

Peripheral processors participating in the algorithm are added to a data structure in the central processor which divides them into one of five groups. Each second, one of the five groups is broadcast the current congestion status. Within each five seconds, each group of peripheral processors will receive at most one message containing the current congestion status. If no message is received within six seconds, the peripheral processor interprets this as the central processor being in overload congestion status.

Other points of origin (for example within the central processor) may also exist for new work initiations of a call process nature. These points may also participate in the overload congestion control mechanism and therefore also receive the broadcast congestion status.

Broadcast message reception and threshold setting

Figure 4:
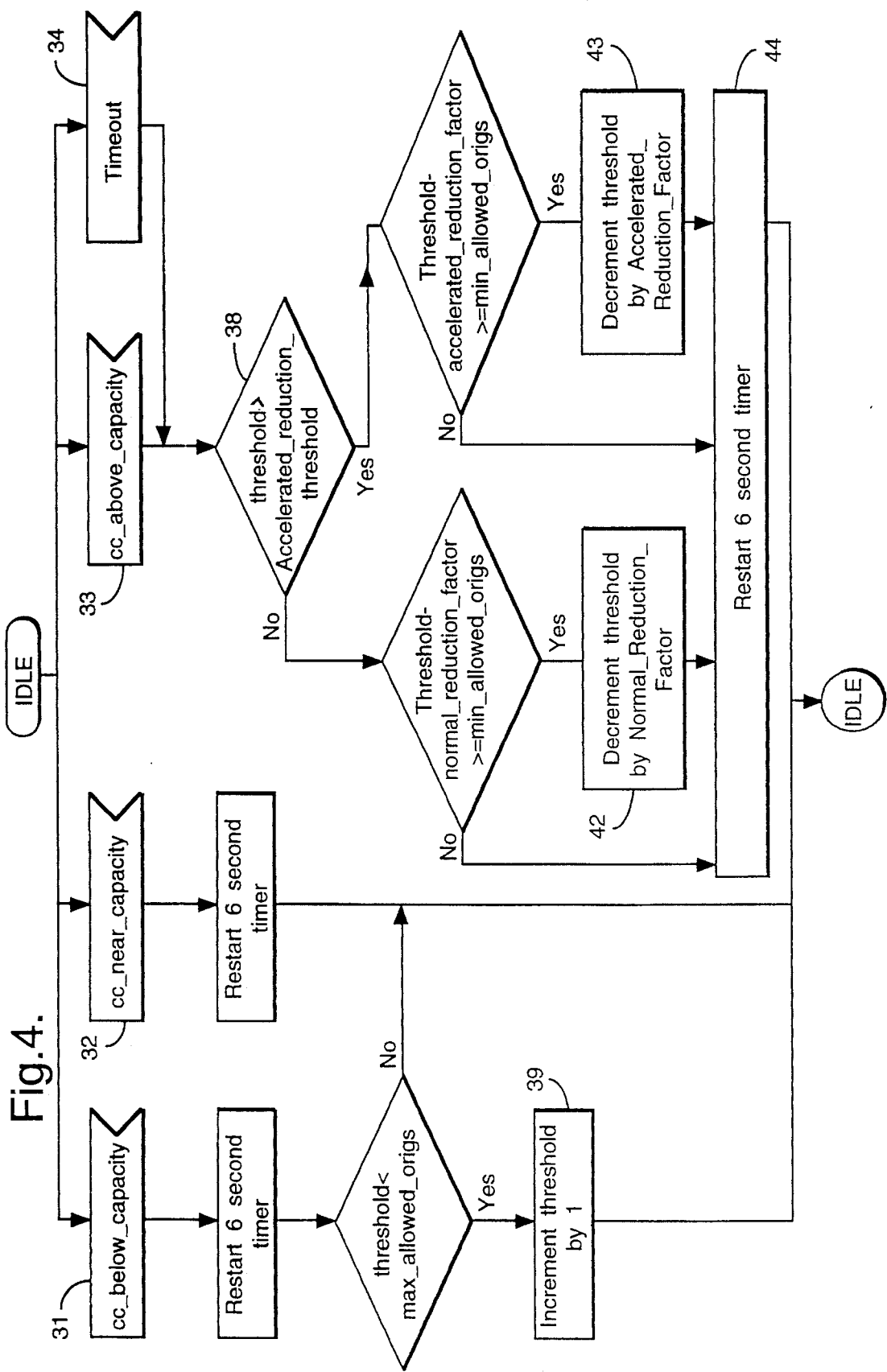
FIG. 4 illustrates an overload control algorithm as used in a peripheral processor.

Peripheral processors exist at each point at which message origination may occur. The overload control algorithm for one of these processors is shown in FIG. 4. Each processor runs a six second timer 44 and waits for a congestion status message. On reception of such a message 31, 32, 33, the congestion status (either 'below capacity', 'near capacity' or 'above capacity') is extracted from the message and thresholds for new traffic origination are adjusted. On reception of the message, the current six second timer is stopped and restarted. If the six second timer expires before the reception of the congestion status message, then this is interpreted as an 'overload' congestion status indication from the central processor and thresholds are adjusted accordingly. The six second timer is then restarted again.

Each peripheral processor maintains five values defined as follows:

max. allowed originations and min allowed originations:

A definition of an upper and lower bound for origination requests within the five second period. The min allowed originations is normally set to one and max. allowed originations should be high enough not to throttle any messages before the central processor reaches overload.

accelerated reduction thresh:

A value between the max. allowed originations and min allowed originations. If the current allowable origination threshold in the current five second period is above this value then the threshold is reduced at an accelerated rate (specifically, by the value of the accelerated reduction factor) if the central processor indicates an overload congestion status. This serves to reduce the originations to the central processor very quickly in the case in which the central processor reports an overload congestion status if the threshold values were at or near the maximum allowable values.

default allowed originations:

A value between the max. allowed originations and min allowed originations which is used as the default origination threshold used at initialisation time. Whenever the algorithm is started up for the first time a smaller than the max. allowed originations value is specified as a threshold for the initial five second period in order that system resources are protected for proper system recovery and system stabilisation.

normal reduction factor:

A value between the accelerated reduction factor and min allowed originations which is used to decrement the number of allowable originations in the current five second period at a normal rate if the central processor indicates an overload congestion status. This value is used when the value of the current origination threshold is below the value of the accelerated reduction thresh. This serves to dampen the reaction of the peripheral processors to an overload condition.

accelerated reduction factor:

A value between the max. allowed originations and min allowed originations to be used as the value with which to decrement the current allowable origination threshold at an accelerated rate when the origination threshold is at or above the accelerated reduction thresh value.

Referring again to FIG. 4, each peripheral processor applies the following algorithm to maintain the current allowable origination threshold: Increase the threshold by one origination 39 in the case in which the congestion status reported as 'below congestion' 31 until the max. allowed originations is reached. When the congestion status reported is 'near congestion' 32 then the threshold is not changed. When congestion status of 'overload' is detected either directly 33 or by a time-out of the six second timer 34 then the threshold is decremented by the accelerated reduction factor 43 whenever the value of the current threshold is at or above the accelerated reduction threshold 38 and the threshold is decremented by the normal reduction factor 42 when the threshold level is below the value of the accelerated reduction thresh 38.

The origination threshold for the current five second period is made available to the application that wants to control the new work origination. In addition there is a counter maintained for each application. It is up to the application to maintain its current origination count below or at the origination threshold. The peripheral processor algorithm zeroes the application count every six seconds or upon reception of a congestion status message from central processor ( at an interval of $<=5$ seconds ).

In the case where the central processor is part of a MSC of a GSM system, overload is prevented by protecting against new 'call' origination from three sources.

1. From connection oriented SCCP connection request (CR) origination on the A interface (between the BSS and the MSC)
2. TCAP transaction initiations from the other interfaces such as the Home Location Register (HLR)—MSC, Short Message Service Centre (SMSC) —MSC, or MSC—MSC.
3. From calls originating from the ISDN User Part (ISUP).

Figure 5:
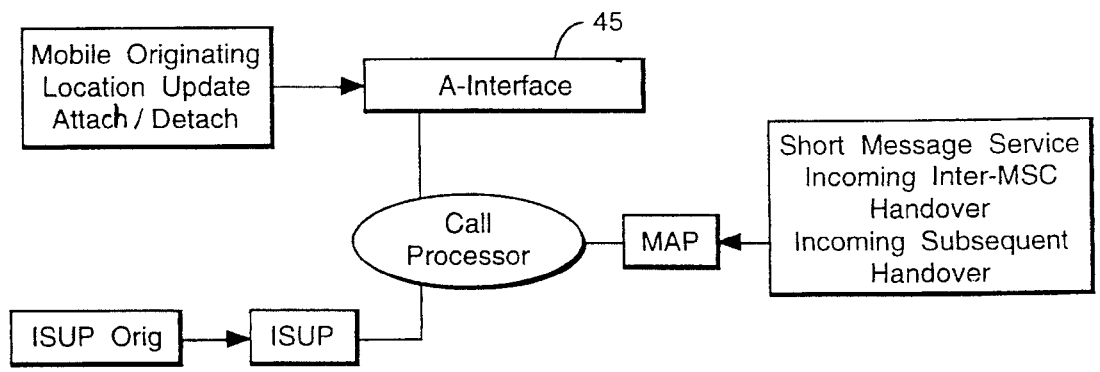
FIG. 5 shows some message sources for the central processor.

FIG. 5 summarises the sources of new origination controlled for a GSM MSC. Some of these sources, and the manner in which they use the origination thresholds, will now be described in more detail:

GSM A interface

On the GSM A interface 45, the interface between a MSC and a BSS, 'originations' are requests for a new SCCP connection (SCCP primitive connect_indication or specifically SCCP Connection Request (CR) messages). New connections are refused if the threshold has been reached by issuing an SCCP Connection Refuse message (CREF).

One of the objectives of the GSM overload control is to maintain existing calls and to reduce the overload state only by not allowing the initiation of new calls. Therefore in the following cases Connection Requests (CRs) are not discarded:

Page responses for MTC (mobile termination call). This is not a new call but the final leg of the set-up of a mobile terminated call which was already allowed into the system from other points of origin within the same node. A significant amount of resources have been invested already by this node and rejection at this point would aggravate the overload condition by causing a retry at the origination side and there would be no return on resources already invested.

Connection indications for GSM mobile call handover. This is a call in progress which is merely moving between cell sites. Denying this connection would drop an existing call.

GSM SMS Interface

Requests for delivery of SMS messages to a mobile station, whether or not that mobile has an active call, is considered an origination on this interface. Requests for new origination at this interface arrive as TCAP invoke messages. Requests for new origination over and above the current threshold at this point of origin results in an abort of the TCAP transaction.

Other interfaces

Careful selection of the values at each point of origin can protect the node from overload and can define an implicit priority and therefore allow the maximisation of good throughput (called 'goodput') i.e. discard at a stage at which the least amount of work has been done and completion of any event in which a significant of resources have already been invested once it has entered the system.

This same algorithm may also be extended to the HLR MAP interface, Inter MSC handover interface and non GSM call origination.

The Control Parameters

Let:

M1= max. allowed originations

M0= min allowed originations.

$T_A$= accelerated reduction thresh for A-Interface origination arrivals in five seconds.

$T_M$= accelerated reduction thresh for MAP-Interface origination arrivals in five seconds.

$T_I$= accelerated reduction thresh for ISUP-interface origination arrivals in five seconds.

$\delta_{i1}$= normal reduction factor, i=A, M, I for each of the interfaces $\delta_{i2}$= accelerated reduction factor, i=A, M, I for each of the interfaces D1= Origination queue delay indication of CP below capacity D2= Origination queue delay indication of CP above capacity and let M0$<=$ Threshold$<=$M1

Figure 6:
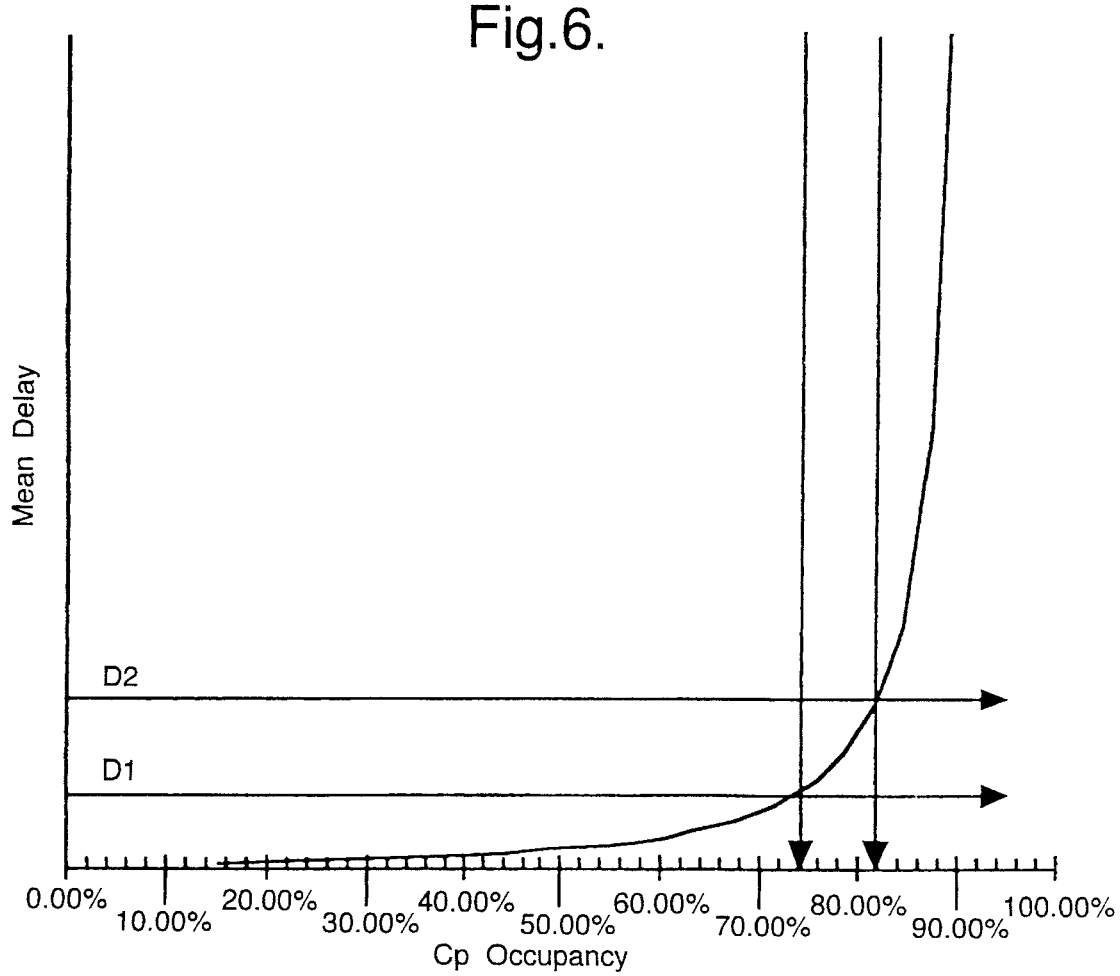
FIG. 6 shows the relationship between queue delay, processor occupancy and capacity thresholds.

It is necessary to determine the value of each of the above parameters. D1 and D2 determine when to start the overload control and the amount of messages which the peripheral processor will send to the central processor at different stages of CP Occupancy. If these parameters are not set correctly, this could either trigger the overload control too early such that the central processor is under-utilised, or trigger it too late. The ideal values of D1 and D2 should be set such that the central processor will start the overload control at its maximum capacity for call processing. As shown in FIG. 6, the relationship between average origination queue delay and call processing occupancy can be plotted through the simulation model. D1 is set at the level at which the origination queue delay starts to reach the full capacity according to the call processor occupancy. This is normally defined by call processor occupancy above 70%. D2 is set at the level at which the origination queue delay reaches the highest tolerable range without throttling messages. In our case D1 is set as the mean delay at which the call processor occupancy reaches 74% and D2 is set as the mean delay at which the call processor occupancy reaches 82%.

The factors contributing to the selection of value of the parameters are as follows:

(1) The central processor type as well as processor speed.

(2) The ratio of number of origination messages and number of progressive messages. This is relatively stable with most call models in cellular systems.

We can use $\lambda$, to represent the arrival rate from peripheral processors to the origination queue (per second). It includes the first message from new calls, location updates, attach/detach (registration and de registration) and handover. Both the arrivals to the origination queue and progress queue are functions of λ. Usually this can be simplified to oλ, for the arrival rate to the origination queue and pλ for the arrival rate to the progress queue, where o and p are constant. 1/μ is the average message processing time (in second). The CP occupancy can be expressed as equation (1). Where o and p are constant.

$$CP\,Occupancy = (o+p)\lambda/\mu \quad (1)$$

If we assume that $\lambda_A$ is the arrivals from A-Interface, and $o_A\lambda_A$ is the arrivals to the origination queue introduced by $\lambda_A$, $\lambda_M$ is the arrivals from another cellular switch (handover messages) that is the MAP interface, $o_M\lambda_M$ is the arrivals o the origination queue introduced by $\lambda_M$, $\lambda_I$ is the arrivals to the origination queue from network side, $o_I\lambda_I$ is the arrivals to the origination queue introduced by $\lambda_I$. Where $o_i$ for i=A,M,I are constant.

$$o\lambda = o_A\lambda_A + o_M\lambda_M + o_I\lambda_I \quad (2)$$

If we use PA as the number of peripheral processors from A interface, PM as the number of peripheral processors from MAP interface, and $P_I$ as the number of peripheral processors from ISUP interface. The following formula has to be satisfied to maintain the CP occupancy around 78%:

$$o_A \frac{T_A P_A}{5} + o_M \frac{T_M P_M}{5} + o_I \frac{T_I P_I}{5} = 0.78 \frac{o\mu}{o+p} \quad (3)$$

Formula (3) provides a base line for the provisioning of $T_A$, $T_M$ and $T_I$. The value of each $T_A$, $T_M$ and $T_I$ can be selected by considering the proportion of messages passing through different interfaces. It also has to consider the priority involved in the messages as we have discussed previously. In our case we select the $T_M$ first and its value is a higher proportion of origination message share compared with other interfaces thus providing the MAP interface with a higher priority than other interfaces. The ISUP interface threshold is selected similarly and the A Interface is selected last by putting $T_M$ and $T_I$ into formula (3).

Another parameter that plays a central role in this algorithm is the accelerated reduction factor $\delta_{i2}$ i=A, M, I. Due to the delay between the time the central processor detects overload and the time at which the peripheral processor starts triggering the overload control, originating messages have built up the originating queue. $\delta_{i2}$ i=A, M, I, therefore, should be more aggressive in order to cut off the new arrivals to the origination queue. After processing the built up origination messages, the central processor will detect a 'cc below capacity' congestion status. By increasing the threshold gradually the central processor will reach a balanced CPU occupancy. $\delta_{i2}$ i=A, M, I also depends on central processor as well as the number of peripheral processors.

$$\delta_{i1}=1 \text{ and } 1<\delta_{i2}<=Ti \text{ for } i=A,M,I$$

Suitable values for the parameters may be found by simulation of a system employing the algorithm.

Simulation Results

The overload control algorithm has been tested using a simulation of a typical call model. The central processor CPU is a Motorola 68030/40. The number of A interface peripheral processors is five, there is one MAP interface peripheral processor and one ISUP interface peripheral processor.

The following data was derived:
D1=100 ms, D2=400 ms.
On the A-interface: $T_A$=12, $\delta_{A2}$=11
On the GSM MAP interface: $T_M$=14, $\delta_{M2}$=7.

On the ISUP interface: $T_I$=5, $\delta_{I2}$=5

The more generic formulas:
A-interface peripheral processor source:
$T_A$=[12*CP Speed/Speed of 68030/40]
$\delta_{A2}$=[11*CP Speed/Speed of 68030/40]
GSM Map Interface:
$T_M$=[14*CP Speed/Speed of 68030/40]
$\delta_{M2}$=[7*CP Speed/Speed of 68030/40]
ISUP interface:
$T_I$=[5*CP Speed/Speed of 68030/40]
$\delta_{I2}$=[5*CP Speed/Speed of 68030/40]

For a different number of A-interface peripheral processor sources:
$T_A$=[12*5/Number of A-interface point of origin sources]
$\delta_{A2}$=[11 *5/Number of A-Interface point of origin sources]

With different CPU processors, the origination queue delay versus CP occupancy will decrease as the processor speed increases. If the processor has twice the speed of 68030/40, we will have D1=100 ms and D2=300 ms.

Figure 7:
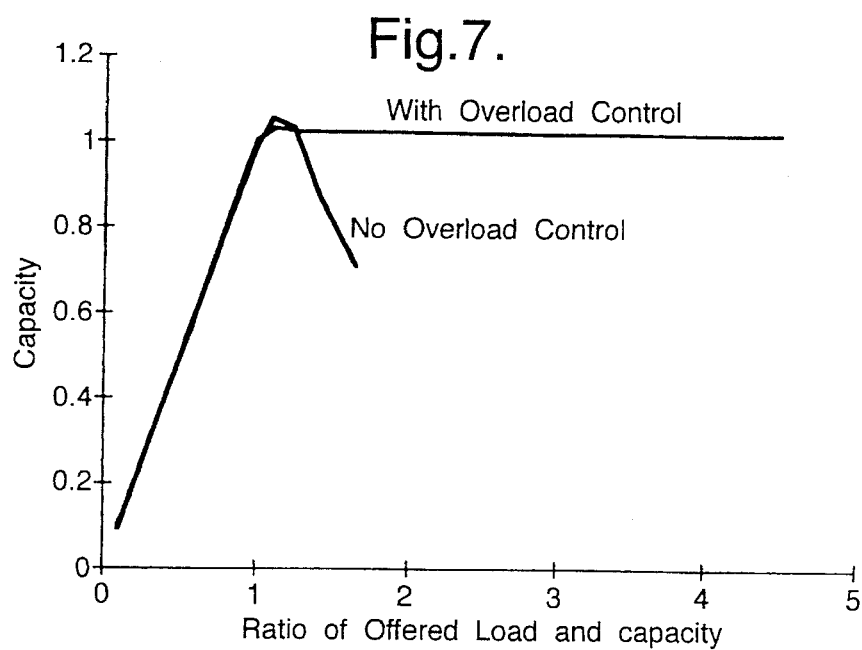
FIG. 7 contrasts the performance of a central processor with and without overload control.
Figure 8:
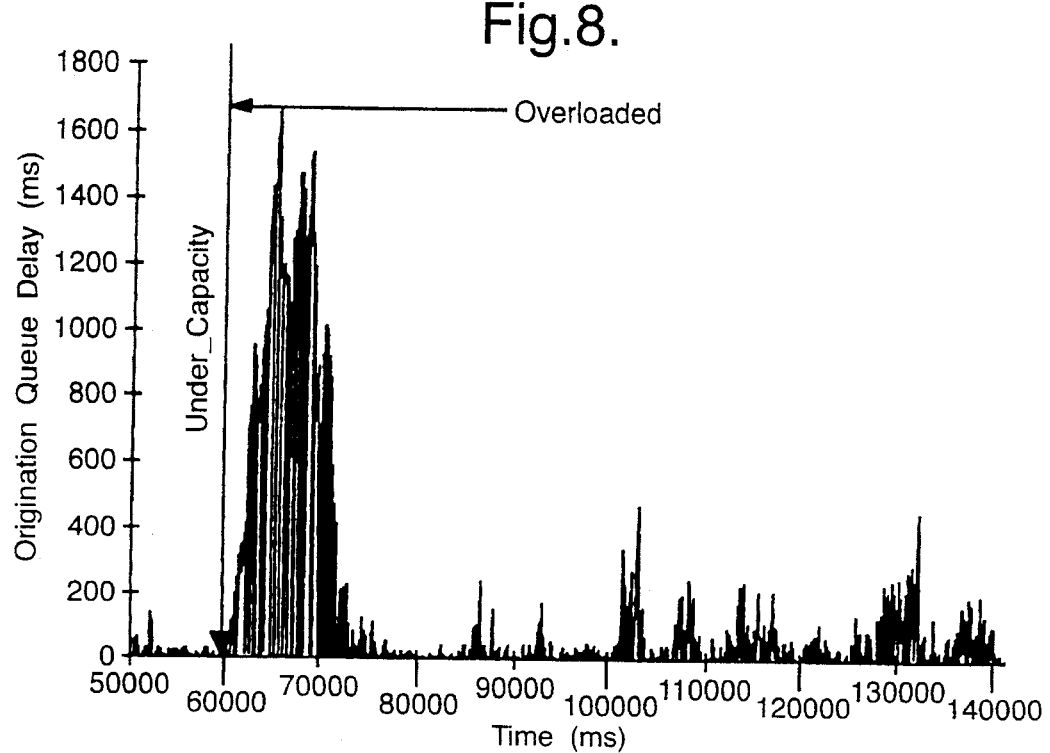
FIGS. 8 and 9 demonstrate the performance of a central processor with overload control.

Simulations confirm that the overload control successfully protects the central processor from overload using the algorithm and values described. FIG. 7 and FIG. 8 show the simulation results of this overload control algorithm. FIG. 7 shows the capacity of the central processor with and without overload control—without overload control the central processor capacity degraded due to the time spent on throttling the messages which have been delayed too long and in which the caller has already reneged and with the overload control algorithm the central processor maintains approximately the maximum capacity even if the offered call traffic to the MSC is greater than its capacity.

FIG. 8 indicates the transient behaviour of origination queue delay with overload control when the offered load to the central processor increases from below congestion to the overload condition. By detection of the central processor congestion status and the subsequent reduction of message origination from the peripheral processors via the overload mechanism described, it can be seen that the origination queue delay will be maintained near the congestion level and that the central processor will stabilise within 15 seconds.

Figure 9:
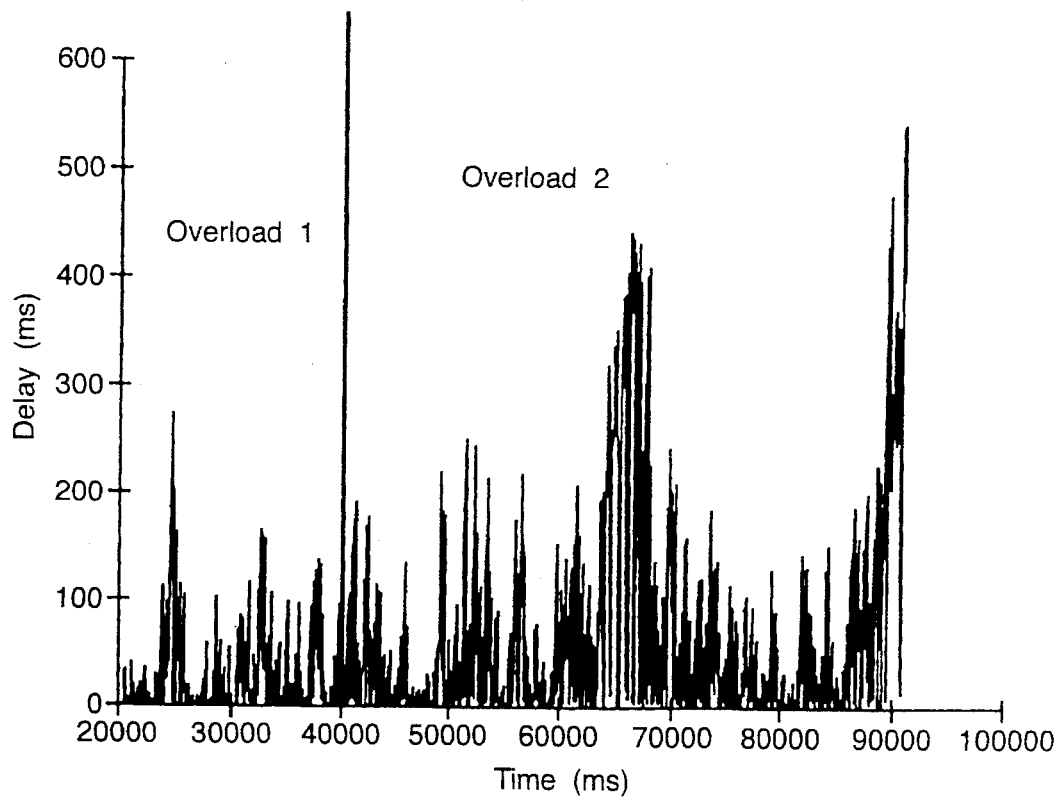

FIG. 9 shows the effects when the offered traffic to the CP increases from one overload traffic level to an even higher one—the origination queue delay in the call processor will retain a similar pattern. This explains that with overload control the call processor becomes insensitive to the increasing load.

The parameters and the formulas for establishing these parameters in conjunction with the described algorithm provides an optimal control mechanism such that the central processor operates at its maximum call capacity no matter by how much the offered traffic to the MSC exceeds its maximum capacity.

This algorithm has been implemented in a GSM MSC and during laboratory testing conducted using a GSM message generator the maximum call capacity was preserved during an overloaded situation, in agreement with the simulation results above.

We claim:

1. A method of controlling overload of a central processor in the switching network of a mobile communications system, in which network peripheral processors send messages to a central processor, which method comprises the steps of:

monitoring delay experienced by messages awaiting processing at the central processor;

using the monitored delay to compile central processor congestion reports indicative of congestion of the central processor;

broadcasting the central processor congestion reports from the central processor to the peripheral processors; and maintaining, at the peripheral processors, variable message origination thresholds responsive to said central processor congestion reports.

2. A method as claimed in claim 1 wherein, if the central processor congestion report indicates that the central processor is not congested, the message origination threshold at the peripheral processors is increased.

3. A method as claimed in claim 1 wherein, if the central processor congestion report indicates that the central processor is congested, the message origination threshold at the peripheral processors is reduced.

4. A method as claimed in claim 3 wherein the message origination threshold is reduced by one or more different reduction factors, the reduction factor chosen according to the magnitude of the message origination threshold.

5. A method as claimed in claim 4 wherein the message origination threshold is reduced by a normal reduction factor if the message origination threshold is below a reduction threshold, and by an accelerated reduction factor if the message origination threshold is above the reduction threshold.

6. A method as claimed in claim 5 in which the peripheral processors are grouped in sets and assigned a priority, and the reduction factors and reduction thresholds differ according to the priority assigned to each set.

7. A method as claimed in claim 6 wherein the central processor has first and second queues and, to maintain the central processor at x% occupancy, the values for the reduction thresholds are set according to the relationship:

$$o_A \frac{T_A P_A}{5} + o_M \frac{T_M P_M}{5} + o_I \frac{T_I P_I}{5} = (x/100) \cdot \frac{o\mu}{o+p}$$

where:

$T_A$, $T_M$, $T_I$ are the reduction thresholds for each set of peripheral processors over five seconds;

$P_A$, $P_M$, $P_I$ are the number of processors in each set;

$o_A$, $o_M$, $o_I$, o are constants defining arrivals to the first queue in the central processor from each set of processors;

p is a constant defining arrivals to the second queue in the central processor;

$\mu$ is the average processing rate of the central processor.

8. A method as claimed in claim 1 wherein the range of possible queue delays is divided into a plurality of queue delay bands, each queue delay band having an associated capacity threshold corresponding to an increasing level of central processor congestion.

9. A method as claimed in claim 8 wherein there are capacity thresholds corresponding to queue delays of full capacity and of highest tolerable level without throttling messages.

10. A method as claimed in claim 8 wherein the step of monitoring queue delay comprises maintaining a count of messages falling within each queue delay band and the step of compiling a central processor congestion report comprises issuing a report according to the queue delay band having the highest count of messages.

11. A method as claimed in claim 1 in which the central processor has a first queue, to which the first message of a new call is added, and a second queue, and where the congestion of the central processor is determined by monitoring the delay experienced by messages waiting in the first queue.

12. A method as claimed in claim 11 wherein an arrival time is appended to messages as they are received by the central processor and queue delay is calculated by comparing a time at which a message is processed with the arrival time of the message.

13. A mobile communications system comprising a switching network having a central processor and a plurality of peripheral processors, the central processor receiving messages from the peripheral processors, wherein the central processor includes:

monitoring means to monitor delay experienced by messages awaiting processing at the central processor;

computing means to compile central processor congestion reports based on monitored delay supplied by the monitoring means the congestion reports being indicative Of congestion of the central processor;

broadcasting means to broadcast the central processor congestion reports from the central processor to the peripheral processors; and wherein each peripheral processor includes:

threshold setting means, responsive to congestion reports received from the central processor, to maintain variable message origination thresholds;

whereby to control overload of the central processor.

14. A mobile radio system as claimed in claim 13 wherein the mobile communications system is a cellular mobile radio system and the central processor is part of a Mobile services Switching Centre (MSC).

15. A mobile radio system as claimed in claim 14 wherein the peripheral processors are also part of the Mobile services Switching Centre (MSC), each peripheral processor connected to an interface that joins the MSC to sources of messages.

* * * * *